US012607042B1

(12) United States Patent
Lo

(10) Patent No.: US 12,607,042 B1
(45) Date of Patent: Apr. 21, 2026

(54) LOCK STRIKE SHUTTER PLATE WITH MAGNETIC TRIGGER UNLOCK MECHANISM

(71) Applicant: Majestic Solutions, Inc., Madison, AL (US)

(72) Inventor: John Hoi Yen Lo, Madison, AL (US)

(73) Assignee: Majestic Solutions, Inc., Madison, AL (US)

( * ) Notice: Subject to any disclaimer, the term of this patent is extended or adjusted under 35 U.S.C. 154(b) by 0 days.

(21) Appl. No.: 18/918,792

(22) Filed: Oct. 17, 2024

Related U.S. Application Data

(60) Provisional application No. 63/544,498, filed on Oct. 17, 2023.

(51) Int. Cl.
*E05B 47/00* (2006.01)

(52) U.S. Cl.
CPC ................................ *E05B 47/0046* (2013.01)

(58) Field of Classification Search
CPC .... E05B 47/0046; E05B 17/18; E05B 17/186; E05B 17/14; E05B 1/04; E05B 15/0205; E05B 15/021; E05B 15/022; E05B 15/029; E05B 77/34; E05B 63/0052; Y10T 292/11; Y10T 292/696; E05C 17/56
USPC .......................................... 70/276, 455, 426
See application file for complete search history.

(56) References Cited

U.S. PATENT DOCUMENTS 309,238 A * 12/1884 Mix ...................... E05B 15/029 70/455
518,405 A * 4/1894 Heymanson ........ E05B 15/0205 292/341.14
521,458 A * 6/1894 Burns ................. E05B 17/2003 292/341.15
1,005,841 A * 10/1911 Hurd ................... E05B 17/0045 292/341.12
1,781,813 A * 11/1930 Goodwin ............ E05B 17/2003 292/346
1,867,694 A * 7/1932 Cramer ................. E05B 15/022 292/341.15

(Continued)

FOREIGN PATENT DOCUMENTS

CA 3059783 A1 * 10/2018 ........... E05B 47/026
CN 102239305 A * 11/2011 ........... E05B 15/022

(Continued)

OTHER PUBLICATIONS

8790 Dust Proof Strike—Accurate Lock & Hardware; retrieved from https://accuratelockandhardw are.com/product/8790-dust-proof-strike/; retrieved on May 9, 2024.

*Primary Examiner* — Steven A Tullia

(74) *Attorney, Agent, or Firm* — BRADLEY ARANT BOULT CUMMINGS LLP

(57) ABSTRACT

A lock mechanism is provided for engaging a lock bolt within a bolt cavity. In one embodiment, the lock bolt is disposed within a strike pocket of a door frame and the bolt cavity is disposed within a strike housing assembly of a door. A shutter plate slideably covers the bolt cavity when the lock bolt is not engaged within the bolt cavity. The shutter plate is configured to be in a normally-closed position and is slidable to an open position when the lock bolt is sufficiently proximate to the bolt cavity, to allow the lock bolt to enter the bolt cavity.

11 Claims, 9 Drawing Sheets

(56) References Cited

U.S. PATENT DOCUMENTS

| | | | | |
|---|---|---|---|---|
| 2,213,814 | A * | 9/1940 | Jacobi | E05B 17/185 70/455 |
| 2,370,781 | A * | 3/1945 | Cullum | E05B 17/2003 292/346 |
| 3,636,745 | A * | 1/1972 | Green | E05B 47/026 70/281 |
| 4,529,234 | A * | 7/1985 | Senften | E05B 47/0046 292/341.16 |
| 4,717,909 | A * | 1/1988 | Davis | E05B 41/00 340/686.4 |
| 5,000,495 | A | 3/1991 | Wolfgang et al. | |
| 5,467,624 | A | 11/1995 | Myers | |
| 5,613,718 | A * | 3/1997 | Lin | E05B 17/2003 292/341.15 |
| 5,729,198 | A * | 3/1998 | Gorman | G07C 9/00182 70/279.1 |
| 5,987,818 | A * | 11/1999 | Dabideen | E05B 63/22 292/144 |
| 6,082,790 | A * | 7/2000 | Mossotti | E05B 17/005 292/289 |
| 6,612,629 | B2 | 9/2003 | O'Hanlon | |
| 7,240,931 | B1 * | 7/2007 | Casey | E05B 15/024 292/341.15 |
| 8,550,508 | B2 * | 10/2013 | Gentile | E05B 17/0037 292/341.15 |
| 8,616,612 | B2 * | 12/2013 | Quinn | E05B 85/045 292/DIG. 3 |
| 8,643,468 | B1 * | 2/2014 | Peabody | G07C 9/00944 340/5.73 |
| 8,998,278 | B2 * | 4/2015 | Wilde | E05B 79/20 292/144 |
| 9,303,434 | B2 * | 4/2016 | Tarquinio | E05B 63/18 |
| 9,309,693 | B2 * | 4/2016 | Puscas | E05B 85/00 |
| 9,482,030 | B2 | 11/2016 | Heinrich et al. | |
| 10,267,059 | B1 * | 4/2019 | Schulz | E05B 15/0205 |
| 10,294,701 | B2 * | 5/2019 | Schoch | B60J 5/0458 |
| 10,662,676 | B1 * | 5/2020 | Monroe | E05B 81/14 |
| 11,428,028 | B2 * | 8/2022 | Gell | E05B 47/0046 |
| 11,536,054 | B2 * | 12/2022 | Chen | E05B 47/0012 |
| 11,674,333 | B2 * | 6/2023 | Milligan | E05B 63/0052 292/201 |
| 2004/0251694 | A1 | 12/2004 | Gorski | |
| 2014/0035301 | A1 | 2/2014 | Alvarez | |
| 2015/0354247 | A1 | 12/2015 | Pena | |
| 2016/0369538 | A1 * | 12/2016 | Ledford | E05B 63/127 |
| 2020/0362592 | A1 | 11/2020 | Jonsson et al. | |
| 2023/0203841 | A1 | 6/2023 | Almomani et al. | |

FOREIGN PATENT DOCUMENTS

| | | | | | |
|---|---|---|---|---|---|
| CN | 106170842 | B | * | 7/2020 | F16P 3/08 |
| DE | 9113493 | U1 | * | 2/1992 | E05C 9/185 |
| DE | 19539800 | A1 | * | 1/1997 | E05B 15/029 |
| DE | 10017310 | B4 | * | 12/2006 | E05B 17/002 |
| DE | 102009027325 | B4 | * | 6/2011 | E05B 15/029 |
| DE | 202014010097 | U1 | * | 2/2015 | E05B 63/248 |
| EP | 0701034 | B1 | | 3/1996 | |
| FR | 2625246 | B1 | * | 6/1990 | E05B 17/0037 |
| FR | 2927348 | A1 | | 8/2009 | |
| GB | 2134590 | A | * | 8/1984 | E05B 15/022 |
| JP | H0813884 | A | * | 1/1996 | E05C 3/22 |
| JP | 2878657 | B2 | * | 4/1999 | E05C 1/16 |
| JP | 3377600 | B2 | * | 2/2003 | E05C 3/22 |
| SE | 437053 | B | * | 2/1985 | E05C 19/182 |
| WO | 2000068535 | A1 | | 11/2000 | |
| WO | 2018104972 | A1 | | 6/2018 | |

* cited by examiner

LOCK STRIKE SHUTTER PLATE WITH MAGNETIC TRIGGER UNLOCK MECHANISM

REFERENCE TO RELATED APPLICATIONS

This application claims priority to U.S. Provisional Application No. 63/544,498, filed Oct. 17, 2023, which is incorporated herein by reference.

BACKGROUND AND SUMMARY

Locks used in prisons and jails must be resistant to attempts by inmates to circumvent the locking mechanisms. One particular problem with door locks is that the lock strike cavities can be stuffed with debris, which can then interfere with engagement of the lock bolts. One current method of ensuring the lock bolt is engaged properly is to install an electronic monitoring device to make sure that the lock bolt is fully extended. Another method requires physically inspecting the strike cavity for any obstructions. A lock strike shutter plate of the present disclosure solves this problem by covering the lock strike cavity when the door is open, preventing the cavity from being accessed. The shutter plate automatically opens as the door is closed so that the lock bolt can engage within the lock strike cavity. A magnetic trigger unlock device enables the shutter plate to open as the door is closed.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

Figure 1:
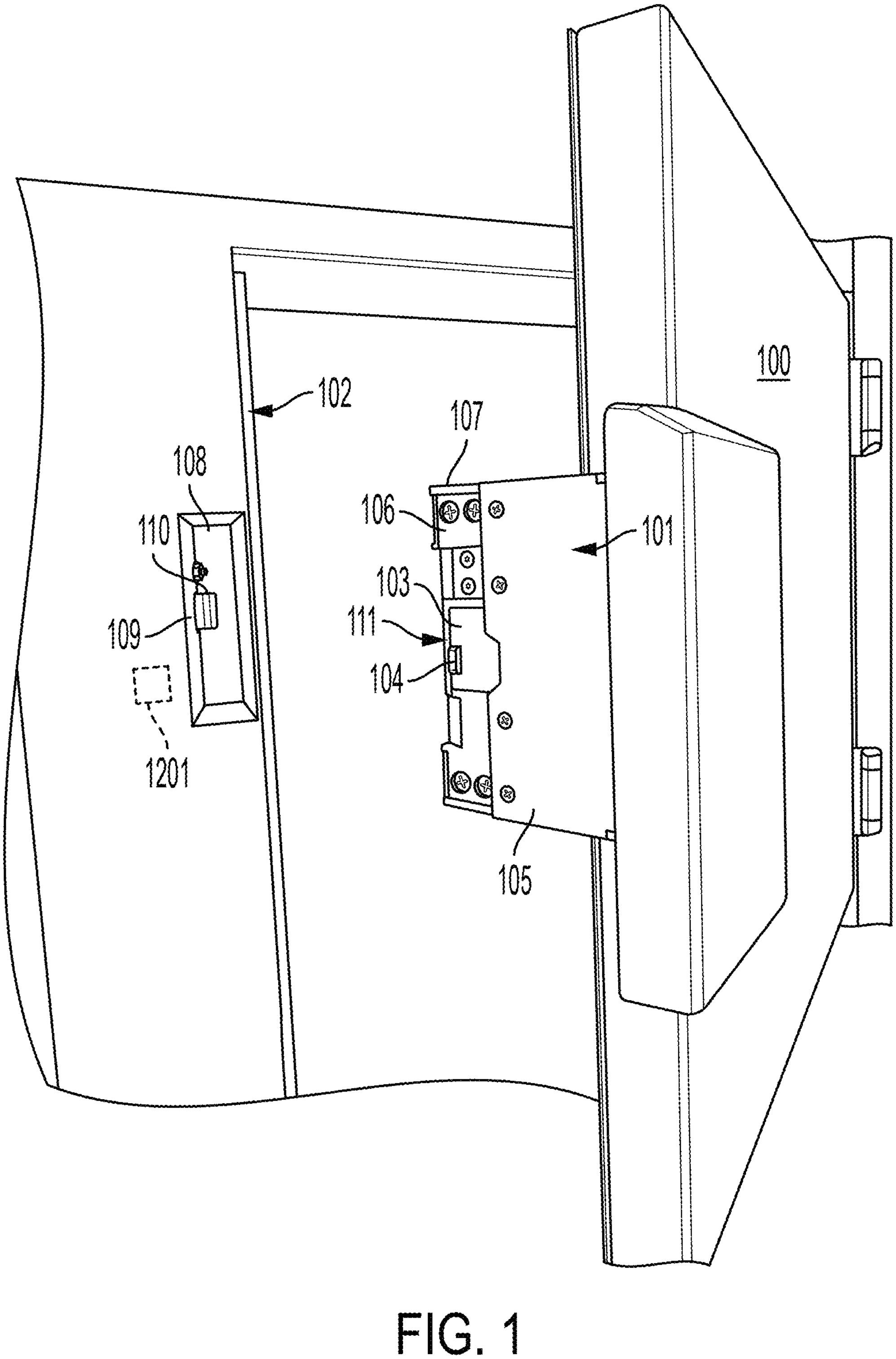
FIG. 1 depicts a lockable door in an open position.

FIG. 1 depicts a lockable door 100 in an open position. (The door 100 depicted is scaled down for illustration purposes.) The door 100 is received within a door frame 102 when closed. The door 100 comprises a strike housing assembly 101 that engages within a strike pocket 108 of the frame 102 when the door 100 is closed.

The strike housing assembly 101 comprises a strike plate 106, a strike chassis 107, and a shutter plate 103. The strike plate 106 comprises a bolt cavity 111 that is covered by the strike plate shutter 103 when the door 100 is open as shown. When the door is closed, a lock bolt 110 within the strike pocket 108 extends into the bolt cavity 111 to secure the door 100 closed. The strike plate shutter 103 is illustrated in FIG. 1 in a closed and locked position, but retracts as the door 100 is closing to expose the bolt cavity 111 for engaging with the bolt 110. A shutter engagement tab 109 extending within the strike pocket 108 contacts a shutter slide tab 104 on the shutter plate 103 to slide the shutter plate open, exposing the bolt cavity 111, as further discussed herein.

In operation of the door 100, when the strike housing assembly 101 enters the strike pocket 108, the shutter slide engagement tab 109 contacts the shutter slide tab 104. However, the shutter plate 103 is prevented from opening because a shutter lever latch 119 (FIG. 7) is in a closed position, blocking the shutter plate 103 from opening until a magnet 1201 is in close enough proximity to a piston 122 (FIG. 6) to cause the piston 122 to move and the shutter lever latch 119 to open, allowing the shutter plate 103 to slide open. The magnet 1201 is shown in dashed lines in FIG. 1 as it is behind the frame. See FIG. 9 for another view of the magnet 1201.

Figure 2:
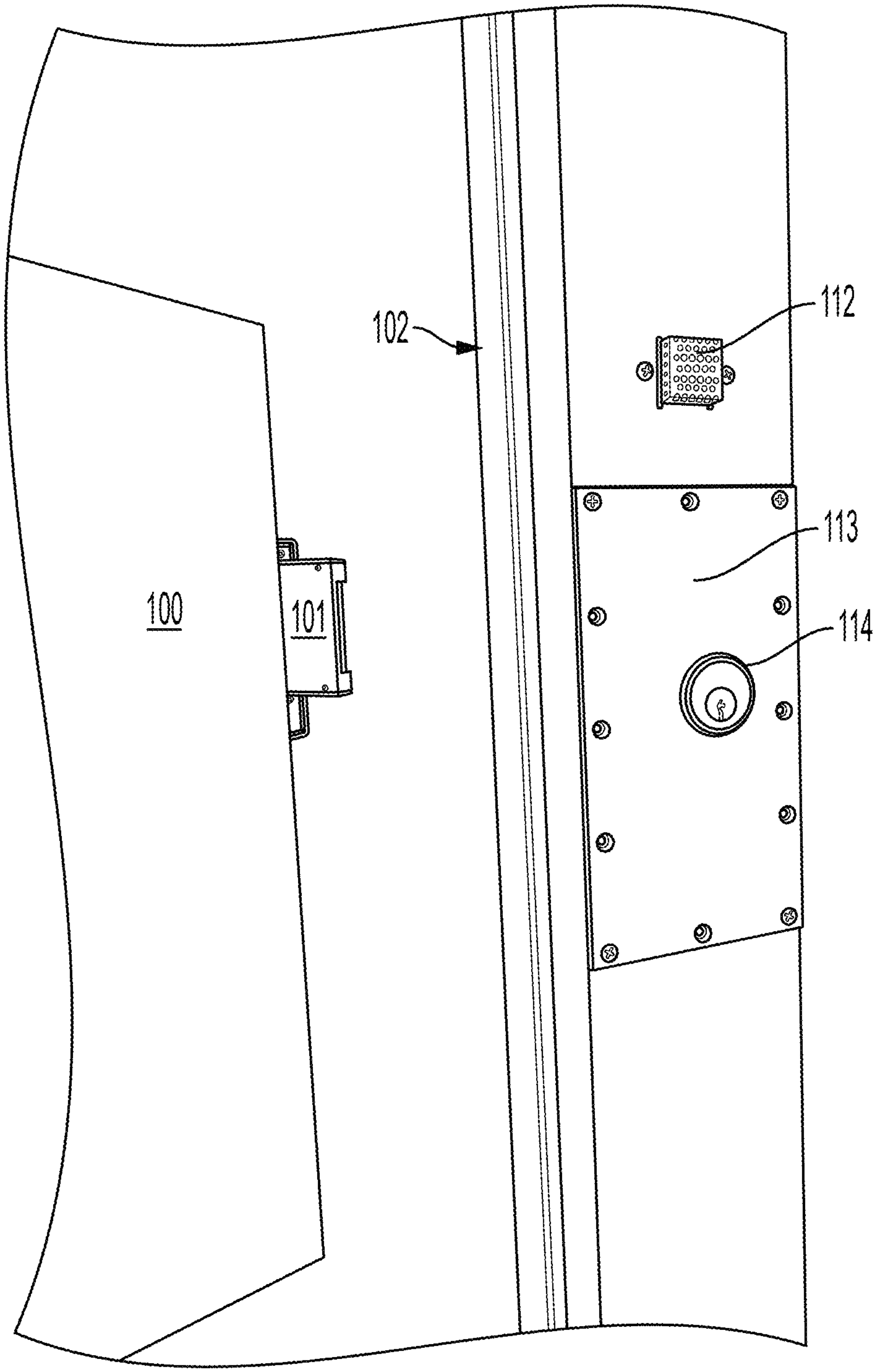
FIG. 2 depicts an opposite side of the door of FIG. 1.

FIG. 2 depicts an opposite side of the door 100 and frame 102 of FIG. 1. A key operable lock 114 receives a key (not shown) in embodiments where the door is manually lockable with a key. A cover plate 113 covers the lock area, and an LED indicator 112 indicates whether the door is locked or unlocked. Other embodiments may not have a key operable lock 114 or LED indicator 112.

The strike housing assembly 101 extends inwardly from the door 100 towards the strike pocket 108 (FIG. 1).

Figure 3:
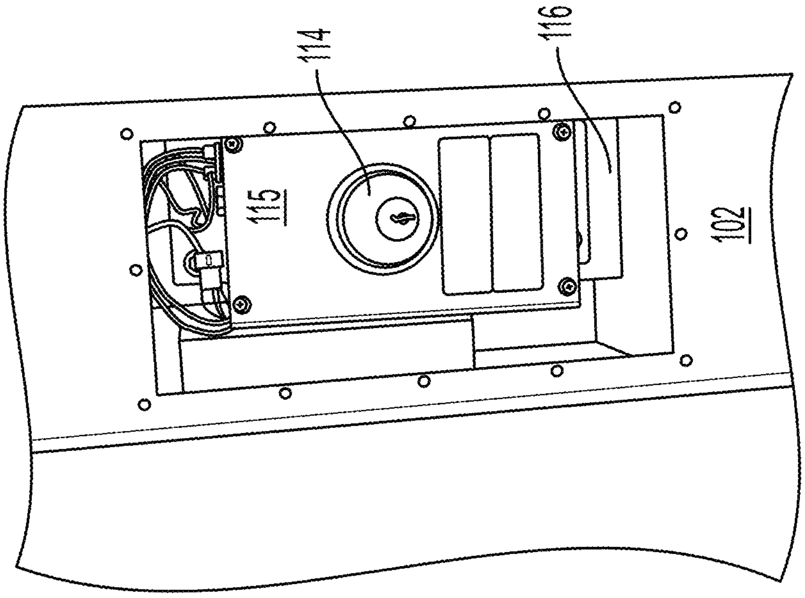
FIG. 3 depicts the key operable lock of FIG. 2 with the cover plate removed.

FIG. 3 depicts the key operable lock 114 of FIG. 2 with the cover plate 113 (FIG. 2) removed. The key operable lock 114 is within a key lock assembly 115 as shown, and fits within a lock cavity 116 the frame 102.

Figure 4:
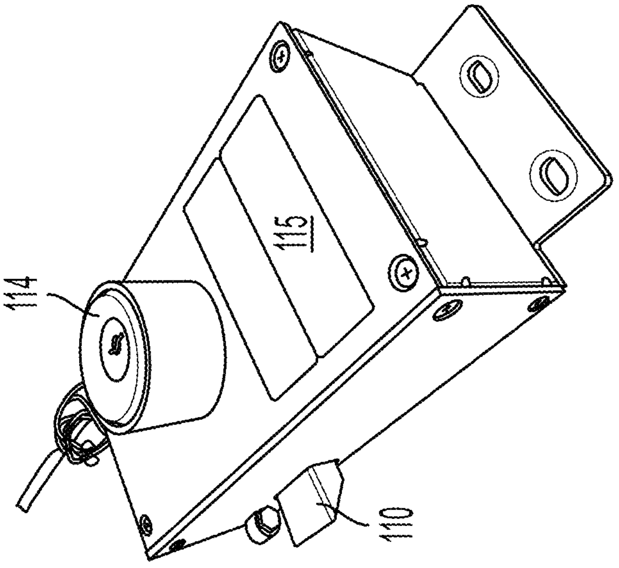
FIG. 4 depicts a key lock assembly of FIG. 3.

FIG. 4 depicts a key lock assembly 115 of FIG. 3. The lock bolt 110 extends from a side of the lock 114 as shown here and in FIG. 1 to secure the lock. The key lock assembly 115 as depicted is known in the art, manufactured by a lock manufacturer. Other types and configurations of key lock assemblies may be used in other embodiments.

Figure 5:
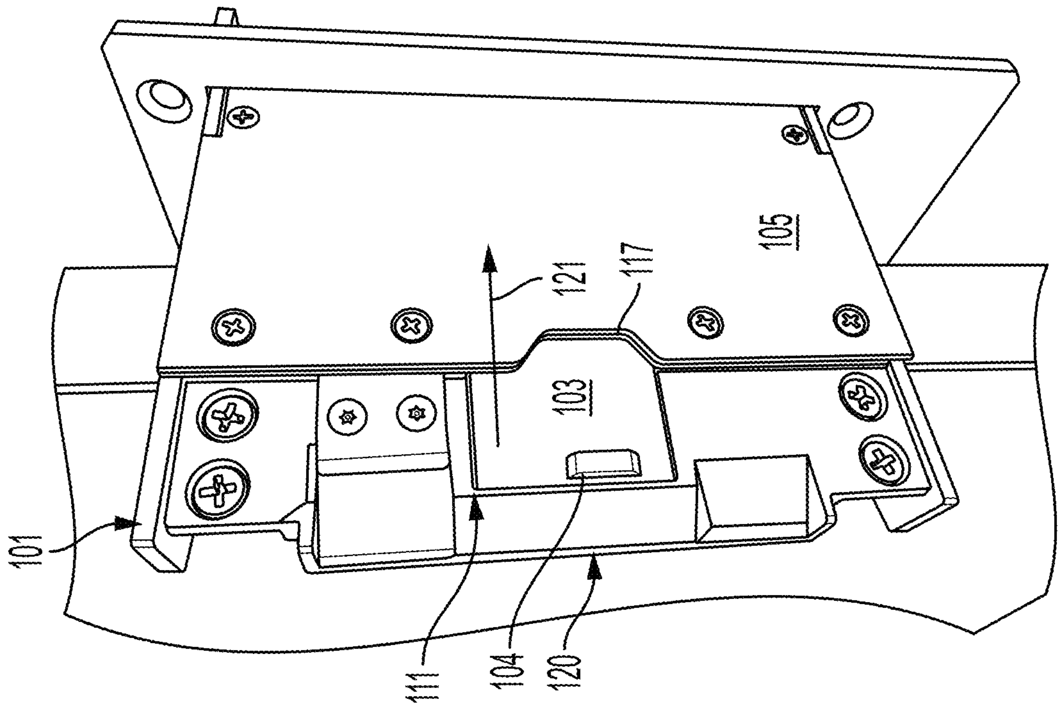
FIG. 5 is an enlarged view of the strike housing assembly of FIG. 1.

FIG. 5 is an enlarged view of the strike housing assembly 101 of FIG. 1. A strike plate 120 is disposed on an outside vertical edge of the assembly 101. The strike plate 120 is known in the art and typically provided by a lock manufacturer. The strike plate shutter 103 is shown in a closed and locked position in the illustrated embodment, and is openable in the direction indicated by directional arrow 121 to uncover the bolt cavity 111, as further discussed herein. An indentation (or cutout) 117 in the strike housing cover 105 receives the shutter slide tab 104 when the shutter plate 103 is in the open position. The indentation 117 prevents the shutter 103 from opening too far by the shutter slide tab 104 contacting the indentation.

Figure 6:
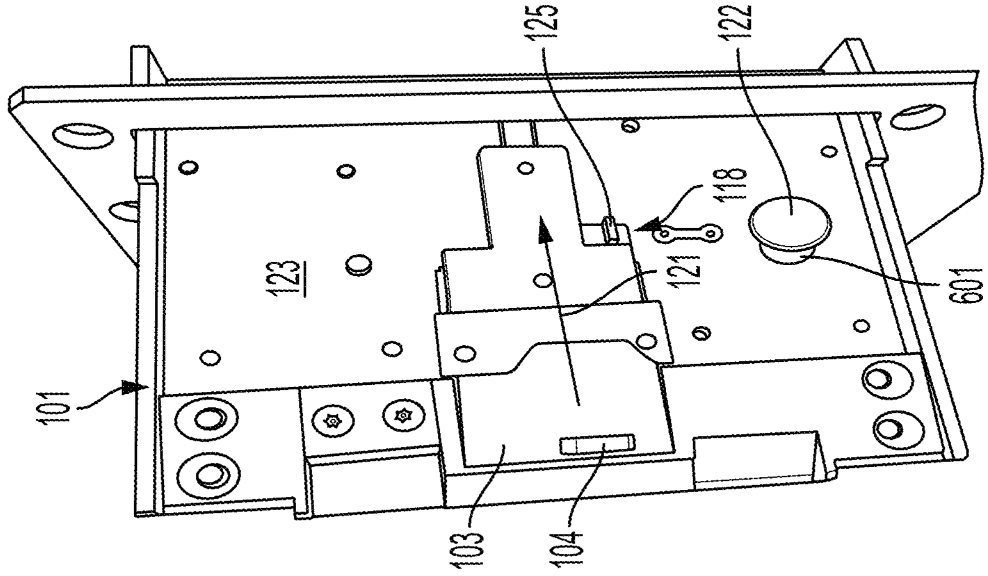
FIG. 6 depicts the strike housing assembly of FIG. 5 with the strike housing cover removed.

FIG. 6 depicts the strike housing assembly 101 of FIG. 5 with the strike housing cover 105 (FIG. 5) removed. As discussed herein, the shutter 103 opens in the direction indicated by directional arrow 121 to expose the bolt cavity 111. A stop end 125 of a shutter lever latch 119 (FIG. 7), which extends through an opening 118 in a strike chassis 123, prevents the shutter 103 from sliding open until a magnet (not shown) is energized to move a piston 122 that pivots the shutter lever latch open 119. In this regard, the stop end 126 of the shutter lever latch 119 extends through the opening 118 until the magnet is energized, and when the stop end 125 extends through the opening 118, the shutter 103 is prevented from sliding open. When the stop end 125 of the shutter lever latch 119 is in an open position (i.e., when it no longer extends through the opening 118 to contact the shutter plate 103), the shutter 103 is able to slide open to expose the bolt cavity 111.

Figure 7:
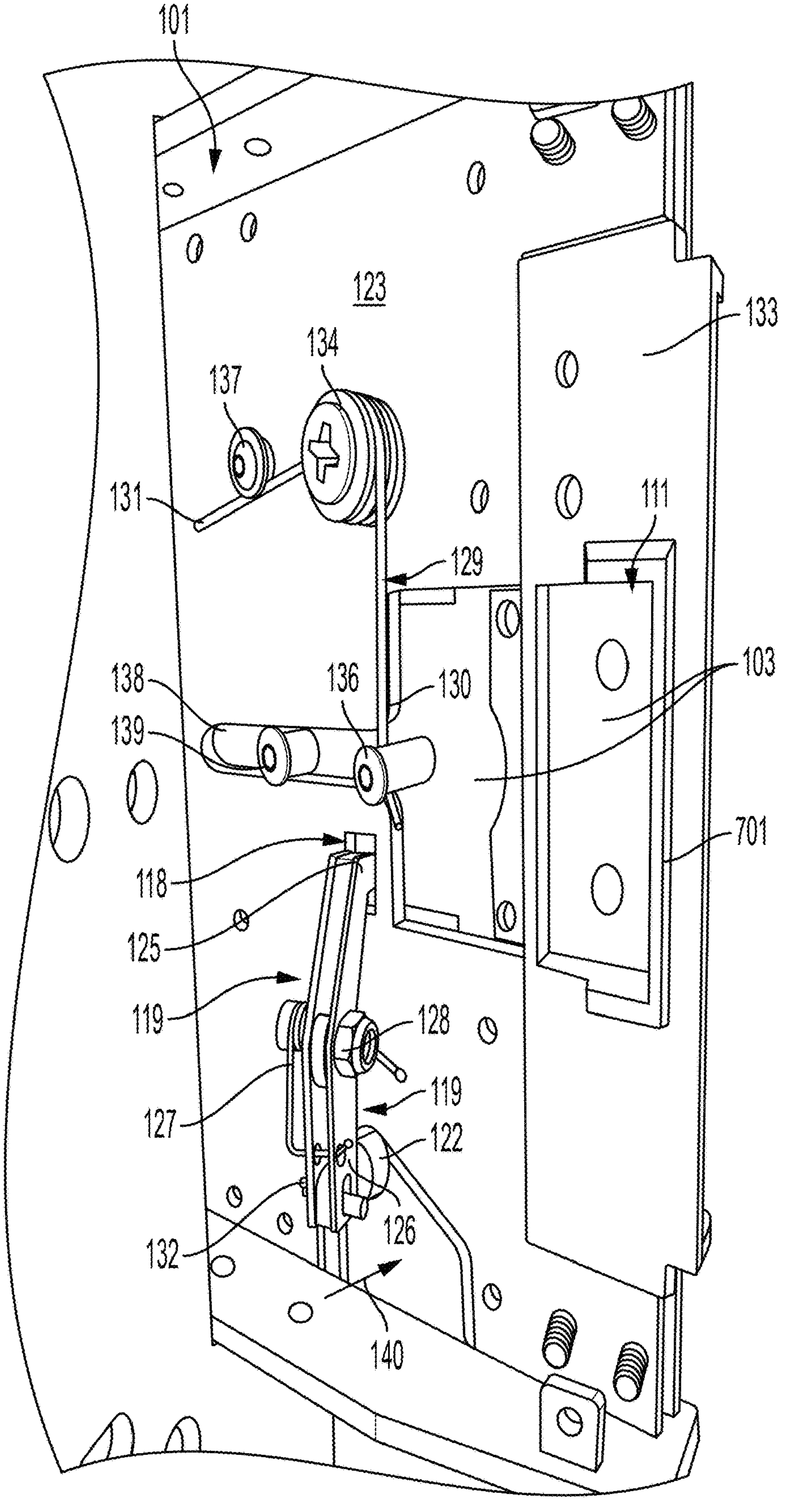
FIG. 7 depicts the back side of the strike housing assembly of FIG. 6, with the cover removed.

FIG. 7 depicts the back side of the strike housing assembly 101 of FIG. 6, with its cover plate (not shown) removed. A guide slot 138 in the strike chassis 123 receives a guide bolt 139 that retains the shutter plate 103 slideably within the strike chassis 123. The guide slot 138 extends horizontally in the illustrated embodiment and allows the shutter plate 103 to slide horizontally as discussed herein.

The bolt cavity 111 comprises a beveled edge 701 that aids in retaining the shutter plate 103 within the strike chassis 123 by preventing the shutter plate 103 from sliding beyond the beveled edge 701 of the bolt cavity.

A shutter reset spring 129 applies force against a first leg stop 136, the first leg stop 136 rigidly affixed to the back side of the shutter plate 103. The shutter reset spring 129 comprises a torsion spring with a first leg 130 that contacts the first leg stop 136 to maintain the shutter plate 103 in a normally closed position. The shutter reset spring 129 further comprises a second leg 131 that contacts a second leg stop 137, the second leg stop 137 rigidly affixed to the strike chassis 123. A mandrel 134 supporting the shutter reset spring 129 is rigidly affixed to the strike chassis 123 as well.

A shutter lever latch 119 is rotatably affixed to the strike chassis 123 has a stop end 125 that extends through the opening 118 in the strike chassis 123 as shown in FIG. 6. The stop end 125 prevents the shutter plate 103 from opening while the stop end 125 extends through the opening 118. A lever latch spring 127 affixed to a shoulder bolt 128 maintains the shutter lever latch 119 in a normally closed position, meaning that the stop end 125 normally extends through the opening 118, until a magnet (not shown) causes a piston end 126 of the shutter lever latch 119 to rotate the piston end 126 in the direction indicated by directional arrow 140 (i.e. towards the strike chassis 123). When the piston end 126 rotates towards the strike chassis 123, the stop end 125 retracts from the opening 118 such that the stop end no longer prevents the shutter plate 103 from opening, and then the shutter plate 103 may open and uncover the bolt cavity 111.

A piston/latch connection pin 132 releasably affixes the piston end 126 of the shutter lever latch 119 to the piston 122.

Figure 8:
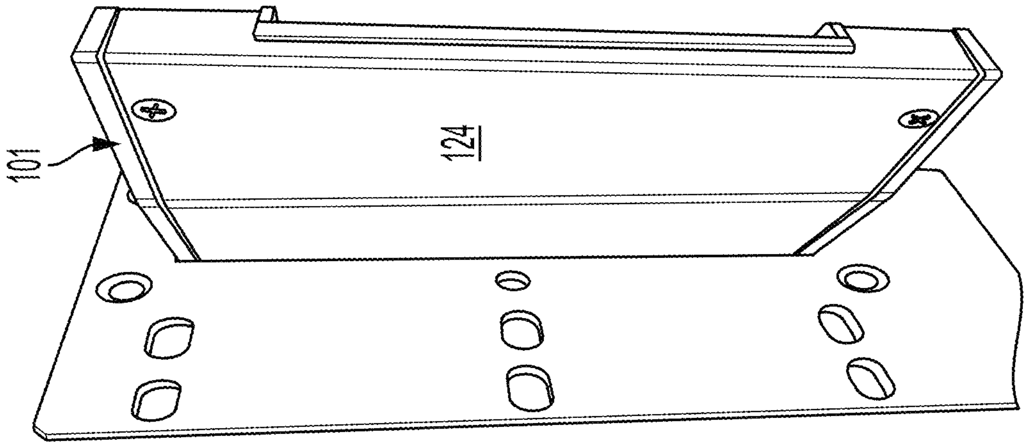
FIG. 8 is another view of the back side of the strike housing assembly including a back cover.

FIG. 8 is another view of the back side of the strike housing assembly 101, this view including a back cover 124.

Figure 9:
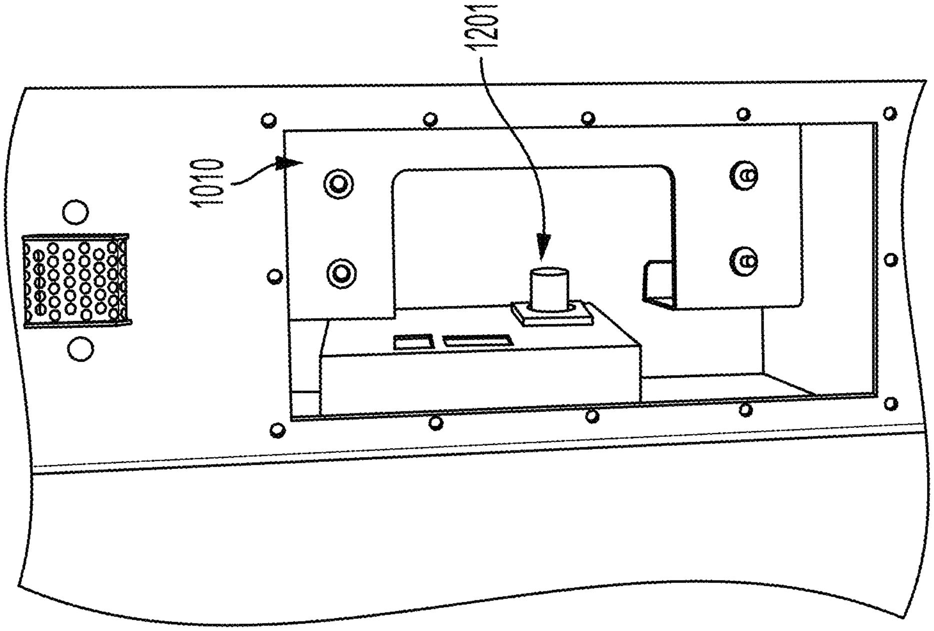
FIG. 9 depicts a rear side of the strike pocket of FIG. 1 showing a magnet in the strike pocket.

FIG. 9 depicts a lock mounting pocket 1010 with the lock 114 (FIG. 2) and cover plate 113 (FIG. 2) removed. A magnet 1201 is disposed within the lock mounting pocket 1010 as illustrated. In operation of the door 100 (FIG. 1), when the strike housing assembly 101 (FIG. 1) enters the strike pocket 108 (FIG. 1), the shutter slide engagement tab 109 (FIG. 1) contacts the shutter slide tab 104 (FIG. 1). However, the shutter 103 is prevented from opening because the shutter lever latch 119 is still in the closed position until the piston 122 moves to allow the stop end 125 of the shutter lever latch 119 to "unblock" the shutter plate 103. When the magnet 1201 is in close enough proximity to the piston 122, the magnet causes the piston 122 to move, allowing the shutter lever latch 119 to rotate and the shutter plate 103 to open.

Figure 10:
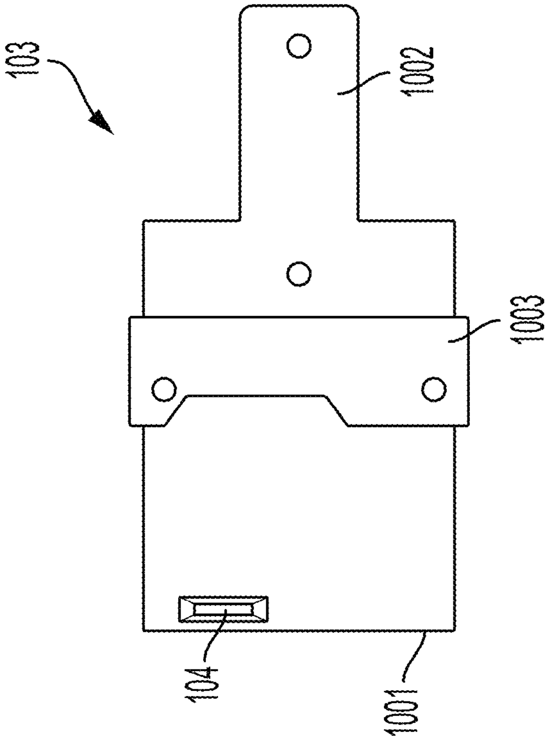
FIG. 10 is an enlarged front side view of the shutter plate.

FIG. 10 is an enlarged front side view of the shutter plate 103. The shutter slide tab 104 is disposed on a first end 1001 of the shutter plate 103. The shutter slide tab 104 extends from the shutter plate outwardly. A second end 1002 of the shutter plate steps down to a narrower width.

Figure 11:
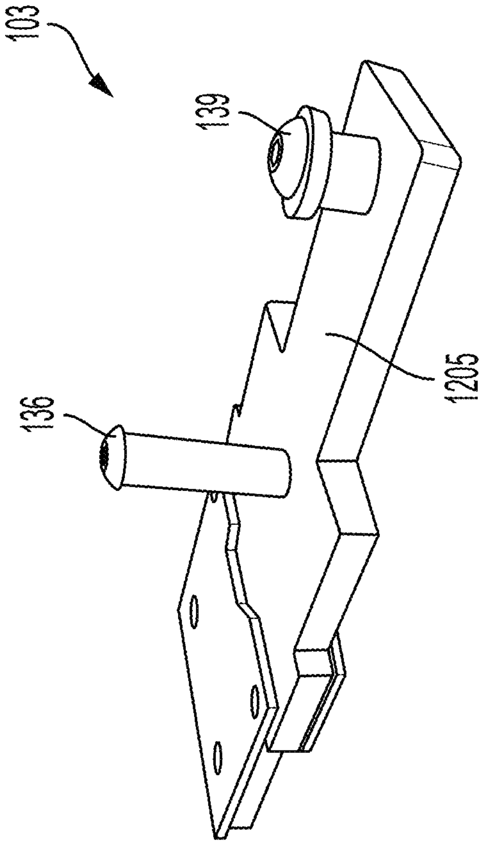
FIG. 11 is an enlarged rear perspective view of the shutter plate.

FIG. 11 is an enlarged rear perspective view of the shutter plate 103. The guide bolt 139 is rigidly affixed to and extends outwardly from a back surface 1205 of the shutter plate 103. In operation of the shutter plate 103, the guide bolt 139 retains the shutter plate 103 slideably within the strike chassis 123 (FIG. 7). In this regard, the guide bolt 139 slides within the guide slot 138 (FIG. 7).

The first leg stop 136 is also rigidly affixed to and extends outwardly from the back surface 1205 of the shutter plate 103 as depicted.

Figure 12:
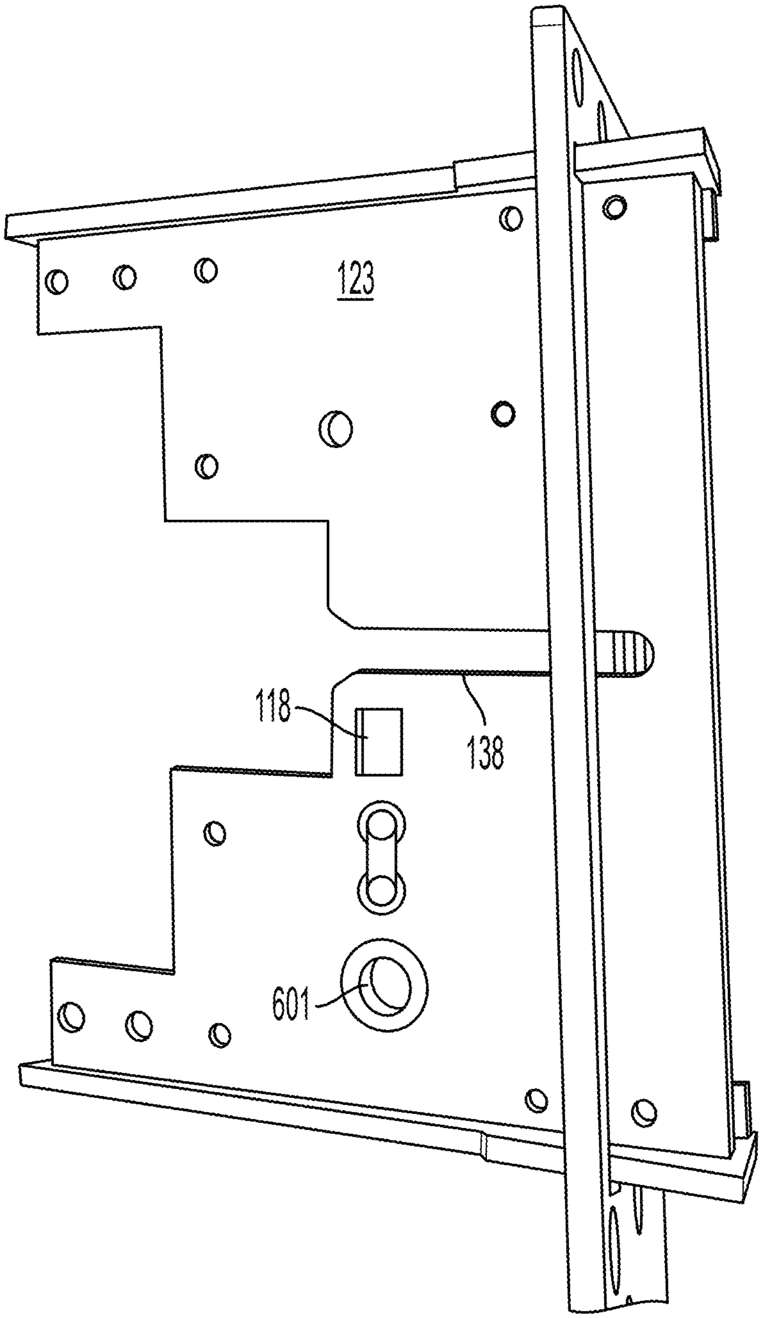
FIG. 12 is an enlarged side view of the shutter plate.

FIG. 12 is an enlarged side view of the strike chasses 123. The guide slot is a cutout in the strike chassis 138 extends horizontally as shown and is configured to receive the guide bolt 139 that retains the shutter plate 103 (FIG. 1) slideably within the strike chassis 123. The opening 118 through the strike chassis is configured to receive the stop end 125 (FIG. 7) of the shutter lever latch 119 (FIG. 7) as discussed above. In this regard, the stop end 125 extends through the opening 118 to prevent the shutter from opening until the piston end 126 of the shutter lever latch 119 is in close enough proximity to the magnet (not shown) to actuate.

An opening 1701 is configured to receive the piston 122 (FIG. 6), the piston 122 being attached to the piston end 122 of the shutter lever latch 119.

Figure 13:
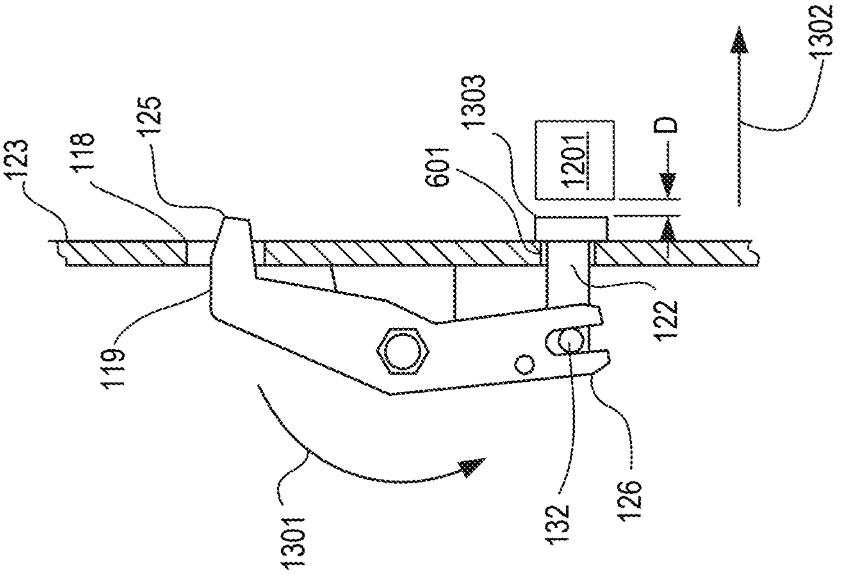
FIG. 13 is a partial cross-sectional view of the strike chassis illustrating the operation of the shutter lever latch.

FIG. 13 is a partial cross-sectional view of the strike chassis 123, illustrating the operation of the shutter lever latch 119. When the shutter plate 103 (FIG. 7) is in the normally-closed position, the stop end 125 of the shutter lever latch 119 extends through the opening 118 in the strike chassis 123, as discussed above with respect to FIGS. 6 and 7. The stop end 125 prevents the shutter plate 103 from opening while the stop end 125 extends through the opening 118. The lever latch spring 127 (FIG. 7) maintains the shutter lever latch 119 in the normally closed position, though the shutter lever latch 119 is rotatable in the direction indicated by directional arrow 1301 when a force sufficient to overcome the force from the lever latch spring 127 is applied.

The piston end 126 of the shutter lever latch 119 is affixed to the piston 122, which piston 122 has a metallic head 1303 that projects from the strike chassis 123. The metallic head 1303 of the piston 122 becomes attracted to the magnet 1201 within the strike pocket 108 (FIG. 1) as the strike housing assembly 101 (FIG. 1) enters the strike pocket 108. Eventually the piston 122 becomes sufficiently close to the magnet 1201 that the spring force from the lever latch spring 127 is overcome by the magnetic force from the magnet 1201 to the metallic head 1303 of the piston 122. When that occurs, the piston 122 moves in the direction of directional arrow 1302 towards the magnet 1201. In one embodiment, the magnetic force is sufficient to move the piston when the metallic head 1303 is a distance "D" of between 0.200 to 0.263" from the magnet.

Note that the strike housing cover 105 (FIG. 5) is not shown in FIG. 13 (or FIG. 14 discussed below) and that the cover 105 is a thin flat plate that covers the outside of the strike housing assembly 101 (FIG. 1) and is thus disposed between the metallic head 1303 of the piston 122 and the magnet 1201.

Figure 14:
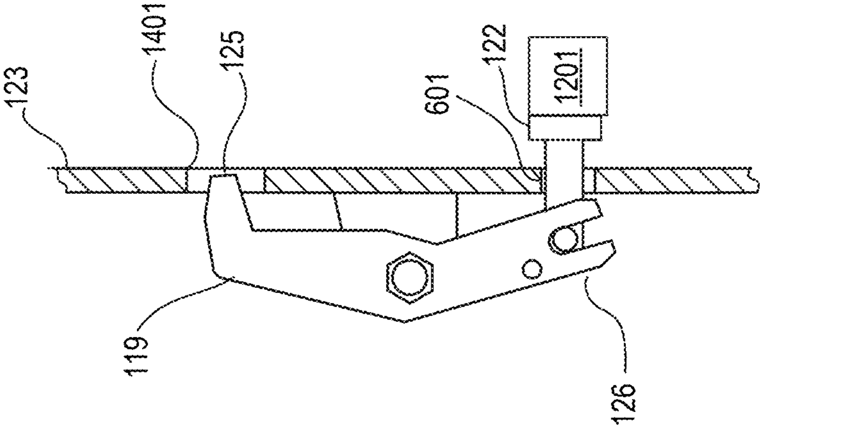
FIG. 14 depicts the shutter lever latch of FIG. 13 after the piston has moved to contact the magnet.

FIG. 14 depicts the shutter lever latch 119 of FIG. 13 after the piston 122 has moved towards the magnet 1201 as discussed above. The piston 122 moving causes the shutter lever latch 119 to rotate until the stop end 125 moves to clear a surface 1401 of the strike chassis 123, such that the stop end 125 no longer contacts the shutter plate 103 (FIG. 7) and the shutter plate can then be slid open as further discussed above.

What is claimed is:

1. A lock mechanism for engaging a lock bolt within a bolt cavity, the lock mechanism comprising:

a shutter plate that slideably covers the bolt cavity when the lock bolt is not engaged within the bolt cavity, the shutter plate configured to be in a normally-closed position and slidable to an open position to allow the lock bolt to enter the bolt cavity when the lock bolt is sufficiently proximate to the bolt cavity;

a strike pocket that contains the lock bolt and a strike housing assembly that contains the bolt cavity; and wherein the strike pocket further comprises a magnet that attracts a piston within the strike housing assembly such that when the magnet is sufficiently close to the piston, the piston moves and actuates a shutter lever latch within the strike housing assembly, the shutter lever latch configured to unlock the shutter plate upon actuation by the piston, allowing the shutter plate to slide open.

2. The lock mechanism of claim 1, the shutter plate further comprising a shutter slide tab extending from the shutter plate, the shutter slide tab engagable with a shutter slide engagement tab disposed within the strike pocket such that when the shutter slide tab contacts the shutter slide engagement tab, the shutter plate slides open to uncover the bolt cavity.

3. The lock mechanism of claim 1, the shutter lever latch comprising a stop end contactable with the shutter plate to maintain the shutter plate in the normally-closed position until the piston actuates the shutter lever latch to unlock the shutter plate.

4. The lock mechanism of claim 1, wherein the strike pocket is disposed within a door frame and the strike housing assembly is disposed on a door, such that the strike housing assembly engages within the strike pocket when the door is closed.

5. A lock mechanism for engaging a lock bolt within a bolt cavity, the lock mechanism comprising:

a strike pocket comprising a lock bolt and a magnet;

a strike housing assembly comprising a bolt pocket, the lock bolt engageable within the bolt pocket;

a shutter plate slideably affixed over the bolt pocket to prevent the bolt pocket from accumulating debris;

a shutter lever latch disposed on the strike housing assembly, the shutter lever latch comprising a stop end that contacts the shutter plate and maintains the shutter plate in a normally-closed position until the shutter lever latch rotates open;

a piston attached to a piston end of the shutter lever latch, the piston comprising a metallic head attractable to the magnet when the piston is in close enough proximity to the magnet, such that when the piston approaches the magnet, the piston end of the shutter lever latch rotates the stop end of the shutter lever latch to unlock the shutter plate, permitting the shutter plate to open.

6. The lock mechanism of claim 5, further comprising a shutter slide engagement tab disposed within the strike pocket and configured to contact a shutter slide tab that extends from the shutter plate as the strike housing assembly becomes engaged within the strike pocket, wherein the shutter slide engagement tab pushing the slide tab causes the shutter plate to slide open and uncover the bolt cavity such that the lock bolt can be engaged within the bolt cavity.

7. The lock mechanism of claim 5, wherein the strike pocket is disposed within a door frame and the strike housing assembly is disposed on a door, such that the strike housing assembly engages within the strike pocket when the door is closed.

8. A lock mechanism for engaging a lock bolt within a bolt cavity, the lock mechanism comprising:

a shutter plate that slideably covers the bolt cavity when the lock bolt is not engaged within the bolt cavity, the shutter plate configured to be in a normally-closed position and slidable to an open position to allow the lock bolt to enter the bolt cavity when the lock bolt is sufficiently proximate to the bolt cavity;

a strike pocket that contains the lock bolt and a strike housing assembly that contains the bolt cavity; and wherein the shutter plate further comprises a shutter slide tab extending from the shutter plate, the shutter slide tab engagable with a shutter slide engagement tab disposed within the strike pocket such that when the shutter slide tab contacts the shutter slide engagement tab, the shutter plate slides open to uncover the bolt cavity.

9. The lock mechanism of claim 8, wherein the strike pocket further comprises a magnet that attracts a piston within the strike housing assembly such that when the magnet is sufficiently close to the piston, the piston moves and actuates a shutter lever latch within the strike housing assembly, the shutter lever latch configured to unlock the shutter plate upon actuation by the piston, allowing the shutter plate to slide open.

10. The lock mechanism of claim 9, wherein the shutter lever latch comprises a stop end contactable with the shutter plate to maintain the shutter plate in the normally-closed position until the piston actuates the shutter lever latch to unlock the shutter plate.

11. The lock mechanism of claim 8, wherein the strike pocket is disposed within a door frame and the strike housing assembly is disposed on a door, such that the strike housing assembly engages within the strike pocket when the door is closed.

* * * * *